United States Patent
Han

(10) Patent No.: US 10,919,000 B2
(45) Date of Patent: Feb. 16, 2021

(54) MXENE BASED COMPOSITING NANOFILTRATION MEMBRANE AND CORRESPONDING PREPARATION METHOD

(71) Applicant: Dalian University of Technology, Dalian (CN)

(72) Inventor: Runlin Han, Dalian (CN)

(73) Assignee: Dalian University of Technology, Liaoning (CN)

( * ) Notice: Subject to any disclaimer, the term of this patent is extended or adjusted under 35 U.S.C. 154(b) by 256 days.

(21) Appl. No.: 16/310,679

(22) PCT Filed: May 17, 2017

(86) PCT No.: PCT/CN2017/084634
§ 371 (c)(1),
(2) Date: Dec. 17, 2018

(87) PCT Pub. No.: WO2018/205290
PCT Pub. Date: Nov. 15, 2018

(65) Prior Publication Data
US 2019/0344222 A1 Nov. 14, 2019

(30) Foreign Application Priority Data

May 12, 2017 (CN) .......................... 2017 1 0327602

(51) Int. Cl.
| | | |
|---|---|---|
| *B01D 69/12* | (2006.01) | |
| *B01D 69/02* | (2006.01) | |
| *B01D 69/06* | (2006.01) | |
| *B01D 71/02* | (2006.01) | |
| *B01D 71/14* | (2006.01) | |
| *B01D 61/02* | (2006.01) | |
| *B01D 67/00* | (2006.01) | |

(52) U.S. Cl.
CPC ......... *B01D 69/125* (2013.01); *B01D 61/027* (2013.01); *B01D 67/0069* (2013.01); *B01D 69/02* (2013.01); *B01D 69/06* (2013.01); *B01D 71/02* (2013.01); *B01D 71/027* (2013.01); *B01D 71/14* (2013.01); *B01D 2323/30* (2013.01); *B01D 2325/02* (2013.01); *B01D 2325/04* (2013.01)

(58) Field of Classification Search
CPC .. B01D 71/021; B01D 69/02; B01D 2325/02; B01D 69/10; B01D 63/081
See application file for complete search history.

(56) References Cited

U.S. PATENT DOCUMENTS

| | | | | |
|---|---|---|---|---|
| 10,418,143 | B2 * | 9/2019 | Swett | H01B 1/04 |
| 10,563,824 | B2 * | 2/2020 | Yeung | F21K 9/90 |
| 10,696,554 | B2 * | 6/2020 | Bedworth | C01B 32/194 |
| 2006/0032823 | A1 * | 2/2006 | Harrison | C02F 1/50 |
| | | | | 210/754 |
| 2010/0025329 | A1 * | 2/2010 | Kawakatsu | B01D 65/08 |
| | | | | 210/638 |
| 2015/0321147 | A1 * | 11/2015 | Fleming | B01D 61/025 |
| | | | | 210/489 |
| 2017/0296982 | A1 * | 10/2017 | Swett | B01D 71/021 |
| 2019/0314770 | A1 * | 10/2019 | Wang | C02F 1/441 |
| 2019/0344222 | A1 * | 11/2019 | Han | B01D 71/027 |
| 2020/0325295 | A1 * | 10/2020 | Losego | B01D 71/024 |

FOREIGN PATENT DOCUMENTS

| | | |
|---|---|---|
| CN | 105597567 A | 5/2016 |
| CN | 105271230 A | 12/2016 |
| CN | 106178979 A | 12/2016 |

OTHER PUBLICATIONS

Mehrnaz Mojtabavi et al , Single-Molecule Sensing Using Nanopores in Two-dimensional transition Metal Carbide (Mxene) Membranes, ACS Publications, ACS Nano 2019, 13, 2019, pp. 30-42-30-53. (Year: 2019).*

Wang Haihui et al, CN106178979 machine translation (Year: 2016).*

* cited by examiner

Primary Examiner — Ana M Fortuna
(74) Attorney, Agent, or Firm — Muncy, Geissler, Olds & Lowe, P.C.

(57) ABSTRACT

The present invention belongs to the membrane separation area, which provides an MXene material based composite nanofiltration membrane and corresponding method. The mentioned membrane is flat membrane, which has supporting layer and functional separation layer and supporting layer is under the functional separation layer. The functional separation layer is a kind of dense ultra-thin layer, no more than 50 μm, prepared with MXene and crosslinking agent. This invention is about a flat composite nanofiltration membrane which has excellent separation performance, thermal resistance and chemical stability because of the novel MXene in the functional separation layer. It can be used in the treatment of the waste water with heavy metal ions, organic solvents or other highly oxidizing solution.

5 Claims, No Drawings

MXENE BASED COMPOSITING NANOFILTRATION MEMBRANE AND CORRESPONDING PREPARATION METHOD

TECHNICAL FIELD

This method belongs to membrane separation area, especially membrane used to seawater desalination, brackish water desalination, treatment of waste water with organic solvents or heavy metal ions.

BACKGROUND

Nanofiltration membrane technology is a new energy saving separation technology. Positively charged nanofiltration membrane attracts great studying because of its special utilization in separation of heavy metal ions, high valent ions, good antifouling performance and antibacterial performance. MXene is 2D crystal material Ti3C2Tx (T represents —F and —OH group) which is etched with HF from ternary layer carbon material (like Ti3AlC2). In order to demonstrate that they come from MAX phase and have similar structure with graphene material, they are named MXene. MXene is a potential membrane material because of its excellent membrane forming ability, thermal resistance and chemical stability. MXene composite membrane on supporting layer has excellent performance and can be used in waste water treatment with high temperature, strong acid or base, and highly oxidizing compounds.

Technical Problem

The present invention aims to provide an MXene based composite nanofiltration membrane to solve the problem of existing separation membrane. Commercialized polymer materials like polysulfone, polyether sulfone, polyethylene sulfone, polyacrylonitrile, polyvinyl chloride, polyvinylidene chloride and cellulose acetate are used to prepare the supporting layer of composite membrane with phase inversion method. Porous ceramic membrane prepared with sintering method, porous glass membrane and porous stainless steel membrane also can be used as the supporting layer. MXene is used as the functional layer of the composite membrane with filtering and coating method. The membrane also needs crosslinking at high temperature to obtain stable and comprehensive performance. This invention helps to simplify the membrane preparation process of nanofiltration and reverse osmosis, improve the long term stability and realize the application in special waste water treatment.

Technical Solution

The technical solution of the present invention is as follows:

An MXene based composite nanofiltration membrane is a flat membrane with a supporting layer under the functional layer.

The functional layer is made of MXene and crosslinking agent to form dense membrane and the thickness of the functional layer is below 50 μm.

The common used crosslinking agents are glutaraldehyde, epoxy chloropropane, epoxy propyl trimethylammonium chloride, trimesoyl chloride, phthaloyl chloride, isophthaloyl dichloride, paraphthaloyl chloride and hexanedioyl chloride.

The supporting layer is made of one or both of materials like cellulose derivative, polysulfone, polyether sulfone, polyethylene sulfone, polyacrylonitrile, polyvinyl chloride, polyvinylidene chloride, polyimide and polyetherimide. The thickness of the supporting layer is between 50-500 μm with pores about 0-100 nm.

The proposed dense thin functional layer also has inorganic and (or) organic additives.

The mentioned inorganic additives are one or mixture of nanosized silica, alumina, titanium oxide, ferriferrous oxide, lanthanum strontium cobalt iron, zeolite, graphene and inorganic salt. The mentioned organic additives are one or mixture of chitosan quaternary ammonium salt, cellulose quaternary ammonium salt, cellulose acetate, polyvinyl alcohol, polyethylene glycol, carboxymethylcellulose, polyvinylidene fluoride, polydimethyl diallyl ammonium chloride and sodium polyacrylate.

The mentioned supporting layer is made of above mentioned polymer or inorganic porous membrane.

The process of MXene based composite nanofiltration membrane preparation is as follows:

1. Preparation of MXene

Ti3AlC2 is slowly dissolved in 50 wt. % HF solution with strong stirring, and the disperse solution A is obtained after 12 h. The concentration of Ti3AlC2 is between 5-20 wt. %. The disperse solution A is centrifugal separated, washed, filtered and dried to obtain MXene material.

The prepared MXene is added into the dimethyl sulfoxide solution and peeled off with ultrasonication. Then inorganic and (or) organic additives are added in to form disperse solution B. The ultrasonication time is between 2-12 h and the concentration of MXene is between 1-5 wt. % while the additive concentration is between 0-2 wt. %.

2. Preparation of Functional Layer of Composite Nanofiltration Membrane

The supporting layer is used as a filter membrane. Disperse solution B is diluted with water and filtered with the supporting layer with pressure or evacuation. The formed functional layer is below 50 μm. The concentration of MXene is between 0.1-2 wt. % in the diluted disperse solution B. The additive concentration is between 0-2 wt. %. The MXene based composite nanofiltration membrane is formed with the filtered membrane being air-dried, blown or dried at high temperature.

3. MXene based composite nanofiltration membrane is immersed in the crosslinking agent solution with a concentration of 0.1-2 wt. %. Then the membrane is post treated at 20-100° C. for 2-30 min to obtain stable MXene based composite membrane.

The mentioned Ti3AlC2 can be replaced with Nb2AlC, V2Al2C or Ti3AlC2.

The invention has meaningful effect. The prepared composite flat membrane has excellent separation performance, thermal resistance and chemical resistance because novel MXene material is used in the fabrication of the functional layer. It has wide application such as waste water treatment comprising of heavy metal ions, organic solvents or oxidizing agents.

DETAILED DESCRIPTION

Follow technology process is used to further explain the method.

Example 1

1. Preparation of Disperse Solution

Prepared MXene is added into dimethyl sulfoxide solution and peeled off with ultrasonication. Then additives are added form disperse solution B. The ultrasonication time is between 2-12 h and the concentration of MXene is 1 wt. % while the additive concentration of nanosized silica and carboxymethylcellulose is 0.5 wt. %.

2. Preparation of Functional Layer of Composite Nanofiltration Membrane

Polymer or porous inorganic membrane is used as filter membrane. Disperse solution B is diluted with water and filtered with filter membrane to form functional layer with fixed thickness. Then the membrane is air-dried, blown or dried at high temperature.

Then the membrane is soaked in the 1 wt. % glutaraldehyde solution for 10 seconds, and dried at 60° C. for 5 min.

3. Application

The membrane is used to treat 1 g/L $MgCl_2$ solution, under 0.3 MPa, the rejection to $MgCl_2$ is 96% with a flux of 10 L/m² h.

Example 2

1. Preparation of Disperse Solution

Prepared MXene is added into dimethyl sulfoxide solution and peeled off with ultrasonication. Then additives are added form disperse solution B. The ultrasonication time is between 2-12 h and the concentration of MXene is 3 wt. %.

2. Preparation of Functional Layer of Composite Nanofiltration Membrane

Polymer or porous inorganic membrane is used as filter membrane. Disperse solution B is diluted with water and filtered with filter membrane to form functional layer with fixed thickness. Then the membrane is air-dried, blown or dried at high temperature.

Then the membrane is soaked in the 0.5 wt. % isophthaloyl dichloride solution for 10 seconds, and dried at 60° C. for 5 min.

3. Application

The membrane is used to treat 1 g/L $MgCl_2$ solution, under 0.3 MPa, the rejection to $MgCl_2$ is 92% with a flux of 12 L/m² h.

I claim:

1. An MXene based composite nanofiltration membrane, wherein the composite nanofiltration membrane is a flat structure, comprising a supporting layer below a separation functional layer;
    the functional layer is a dense thin membrane made of the MXene and a crosslinking agent below 50 μm;
    the crosslinking agent is glutaraldehyde, epoxy chloropropane, epoxy propyl trimethylammonium chloride, trimesoyl chloride, phthaloyl chloride, isophthaloyl dichloride, paraphthaloyl chloride, or hexanedioyl chloride;
    the supporting layer is made of cellulose derivative, polysulfone, polyether sulfone, polyethylene sulfone, polyacrylonitrile, polyvinyl chloride, polyvinylidene chloride, polyimide, polyetherimide, or a combination thereof; a thickness of the supporting layer is between 50-500 μm with pores about 100 nm.

2. The MXene based composite nanofiltration membrane according to claim 1, wherein the dense thin functional layer also has inorganic and/or organic additives.

3. The MXene based composite nanofiltration membrane according to claim 2, wherein the inorganic additives are one or a mixture of nanosized silica, alumina, titanium oxide, ferriferrous oxide, lanthanum strontium cobalt iron, zeolite, graphene and inorganic salt; the organic additives are one or a mixture of chitosan quaternary ammonium salt, cellulose quaternary ammonium salt, cellulose acetate, polyvinyl alcohol, polyethylene glycol, carboxymethylcellulose, polyvinylidene fluoride, polydimethyl diallyl ammonium chloride and sodium polyacrylate.

4. The MXene based composite nanofiltration membrane according to claim 3, wherein the supporting layer is made of polymer or inorganic porous membrane.

5. A preparation method of the MXene based composite nanofiltration membrane of claim 2, comprising steps as follows:
   (1) separation of MXene
   $Ti_3AlC_2$ is slowly dissolved in 50 wt. % HF solution with strong stirring, and a disperse solution A is obtained after 12 h; the concentration of $Ti_3AlC_2$ is between 5-20 wt. %; the disperse solution A is centrifugal separated, washed, filtered and dried to obtain the MXene material;
   the prepared MXene is added into the dimethyl sulfoxide solution and peeled off with ultrasonication; then inorganic and/or organic additives are added in to form a disperse solution B; the ultrasonication time is between 2-12 hours and the concentration of MXene is between 1-5 wt. % while the additive concentration is 2 wt. %;
   (2) separation of functional layer of the composite nanofiltration membrane
   the supporting layer is used as a filter membrane; disperse solution B is diluted with water and filtered with the supporting layer with pressure or evacuation; the formed functional layer is 50 μm in thickness; the concentration of MXene is between 0.1-2 wt. % in the diluted disperse solution B; the inorganic additive and/or organic additive concentration is below 2 wt. %; the MXene based composite nanofiltration membrane is formed with the filtered membrane being air-dried, blown or dried at high temperature;
   (3) the prepared MXene based composite membrane is immersed in the crosslinking agent solution with 0.1-2 wt. % concentration; then the membrane is post treated at 20-100° C. for 2-30 min to form stable MXene based composite nanofiltration membrane.

* * * * *